United States Patent [19]
Kojima et al.

[11] Patent Number: 6,053,037
[45] Date of Patent: Apr. 25, 2000

[54] SPRAY DISTRIBUTION MEASURING DEVICE AND MEASURING METHOD

[75] Inventors: Shinji Kojima; Osamu Matsumoto, both of Tokyo, Japan

[73] Assignee: Mitsubishi Denk Kabushiki Kaisha, Tokyo, Japan

[21] Appl. No.: 09/141,111

[22] Filed: Aug. 27, 1998

[51] Int. Cl.[7] .................................................. G01M 15/00
[52] U.S. Cl. .......................................................... 73/119 A
[58] Field of Search ............................. 73/865.6, 865.8, 73/865.9, 119 A, 749, 750; 239/74

[56] References Cited

U.S. PATENT DOCUMENTS 4,739,663  4/1988  Peterson ..................................... 73/749

FOREIGN PATENT DOCUMENTS 844 230  7/1952  Germany .............................. 73/119 A
0110558  9/1981  Japan .................................... 73/119 A

*Primary Examiner*—Robert Raevis
*Attorney, Agent, or Firm*—Sughrue, Mion, Zinn, Macpeak & Seas, PLLC

[57] ABSTRACT

A spray distribution measuring device comprises a chamber 4 having a spray nozzle 1 as a measurement object at the top; a saucer 3 arranged below the spray nozzle within the chamber 4 and partitioned into a plurality of regions each having a prescribed area; measuring tubes 6 each installed substantially vertically from each region of the saucer 3 and having a prescribed sectional area, the upper end of each of which opens into the bottom of each region of the saucer; pressure sensors 7 each installed at the lower end of each of the measuring tubes to measure the head pressure of each measuring tube; and a controller 10 for computing a difference between the pressure applied to the pressure sensor and an initial pressure, and measures the spray distribution on the basis of a difference between the head pressure of the a test solution accumulated in each measuring tube by spraying and the initial pressure before the spraying.

12 Claims, 6 Drawing Sheets

SPRAY DISTRIBUTION MEASURING DEVICE AND MEASURING METHOD

BACKGROUND OF THE INVENTION

The present invention relates to a spray distribution measuring device for measuring the spray characteristic of a fuel injection nozzle used in a fuel injection device of an internal combustion engine and a method of measuring it.

The distribution of spray from a fuel injection nozzle used for an internal combustion engine greatly affects the performance of the internal combustion engine and waste therefrom. Several kinds of techniques have been adopted for the measurement.

FIGS. 9 and 10 show an example of conventional measuring devices and methods, respectively. FIG. 9 is a view showing the structure of a measuring device, and FIG. 10 is a view for explaining the measuring method. In FIGS. 9 and 10, reference numeral 1 denotes an injection nozzle which is an object for measurement. Reference numeral 2 denotes a nozzle driving circuit for driving the injection nozzle at any optional valve opening time, frequency and number of times of injection. Reference numeral 3 denotes a saucer installed at a prescribed port below the injection nozzle and partitioned to provide a plurality of regions each having a prescribed individual shape. Reference numeral 4 denotes a chamber with the injection nozzle attached to its upper surface and with the saucer 3 housed on the bottom, whose internal pressure is controllable.

In measuring the distribution of spray by the conventional measuring device thus structured, the nozzle driving circuit 2 drives the injection nozzle 1 at a prescribed valve opening time and number of times of injection. A spray test solution injected from the injection nozzle 1 becomes spray to fall into and trapped by each of the partitioned regions of the saucer 3. Upon completion of injection, the saucer 3 is taken out from the chamber 4. As seen from FIG. 10, the quantity trapped by each of regions of the saucer 3 is measured using a volume meter 5 such as a graduated cylinder. The chamber 4 is designed to improve the accuracy of test by separating the particulate spray test solution from the outer air flow and permit the test to be carried out under a positive pressure or negative pressure by changing the inner pressure as necessary.

In the measurement of the distribution of spray, in order to improve the measurement accuracy, it is necessary to increase the number of partitioned regions of the saucer 3 so that the area of each unit region is reduced. However, in the conventional measurement method as described above, an increase in the number of the partitioned regions leads to an increase in the time required for the measurement. Further, since the saucer 3 must be taken out from the chamber 4 for each measurement, in the measurement under the other condition than the atmospheric atmosphere, for each measurement, the internal pressure must be returned to the atmospheric pressure in order to open the chamber and at the subsequent measurement, the condition must be set again. This is very inefficient. In addition, when the test solution is replaced into the volume meter, an error is apt to occur so that the test accuracy may be deteriorated.

Further, in the SAE paper. 960108, another measuring technique is disclosed. This technique, with a large number of bottomed tubes, each of which has an opened upper end, arranged within the chamber, sprays a test solution from an injection nozzle from the top of the chamber, automatically measures a change in the weight of each bottomed tube using a plurality of load cells attached to an actuator and supplies the measured values to a computer for measurement of the distribution of spray. This technique could improve the measurement accuracy, but could not simultaneously carry out the measurement for all bottomed tubes arranged at a high density. Further, this technique, in which the actuator with the load cells attached is moved in three (X, Y and Z) directions in a predetermined order, was limited to shorten the measurement time. In addition, this technique, in which a large-scale actuator cannot be housed in the chamber, was required to open the chamber and reset the pressure for each measurement.

SUMMARY OF THE INVENTION

The present invention has been accomplished to solve the problem described above, and intends to provide a spray distribution measuring device which can measure the spray distribution in a short time, at high accuracy and with a small error, even with an increased number of partitioned regions, and also can continuously carry out the measurement even under the other pressure than the atmospheric error within the chamber.

The spray distribution measuring device according to the present invention comprises: a spray nozzle; a saucer arranged below the spray nozzle and partitioned into a plurality of regions each having a prescribed area; measuring tubes each installed substantially vertically from each region of the saucer and having a prescribed sectional area, the upper end of each of which opens into the bottom of each region of the saucer; pressure sensors each installed at the lower end of each of the measuring tubes to measure the head pressure of each measuring tube; and a controller for computing a difference between the pressure applied to the pressure sensor and an initial pressure, and measures the amount of a test solution trapped by each region of the saucer and accumulated in each measuring tube on the basis of a difference between the head pressure and an initial pressure of each measuring tube, thereby acquiring the distribution of spray.

In the spray distribution measuring device, said measuring tubes each is divided into an upper measuring tube and a lower measuring tube, the saucer and upper measuring tubes are integrated and movably housed within a chamber, and a driving device is provided for separating the lower measuring tubes each inserted into the housing externally from below and said upper measuring tubes from each other and connecting them to each other. In this configuration, by externally operating the driving device externally, when the spray distribution is measured under the other pressure than an atmospheric pressure within the chamber, it can be measured continuously and repeatedly in a state with the pressure maintained.

The spray distribution measuring device is provided with a drain valve for draining a test solution within the chamber. In this configuration, the unlimited number of times of successive measurement with the pressure held within the chamber can be carried out.

In the spray distribution measuring device, the pressure is applied to each of pressure sensors as a background pressure. In this configuration, the measurement accuracy can be improved under the other pressure than the atmospheric pressure.

The method of measuring a spray distribution according to the present invention, comprises a step of arranging measuring tubes each having a prescribed sectional area below a plurality of regions each having a prescribed area into which a saucer is partitioned, a step of providing a pressure sensor at the lower ends of said measuring tubes, respectively, and measuring a spray distribution on the basis of a difference between the pressure within each of said measuring tubes and an initial pressure therein.

DETAILED DESCRIPTION OF THE PREFERRED EMBODIMENTS

Embodiment 1

Figure 1:
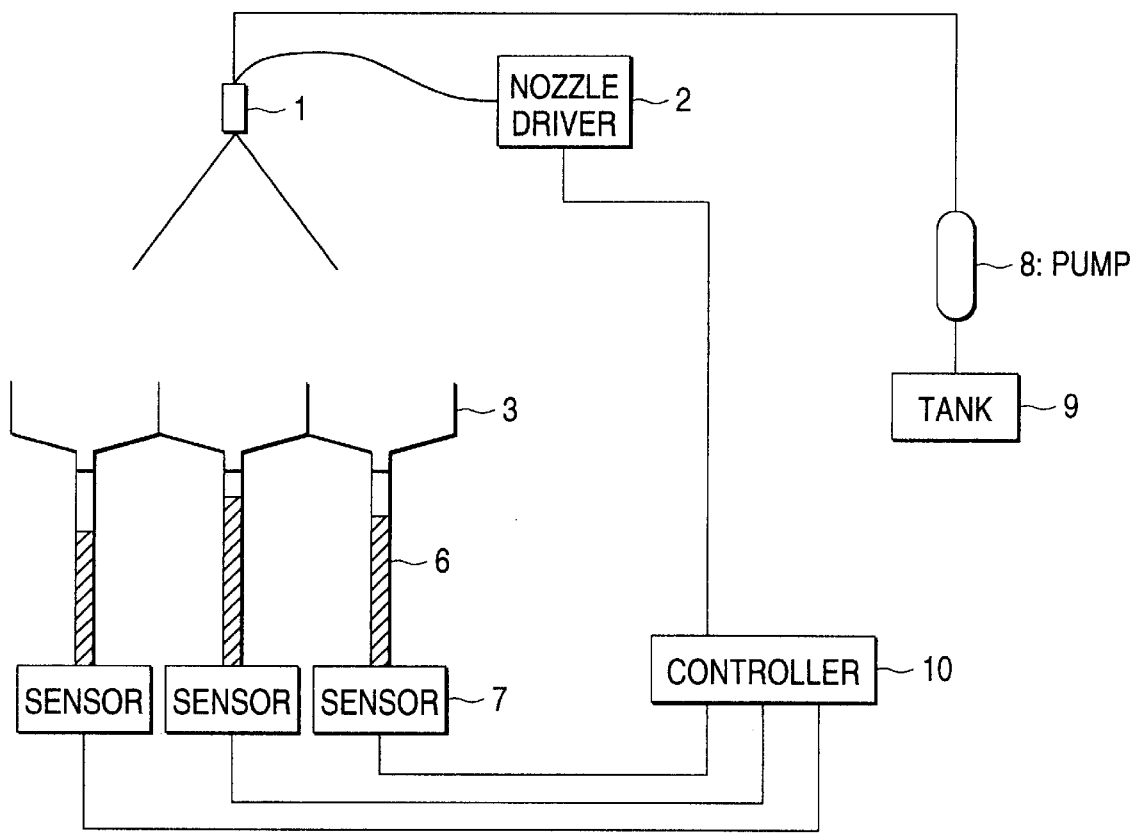
FIG. 1 shows an arrangement of the first embodiment of the present invention.
Figure 2:
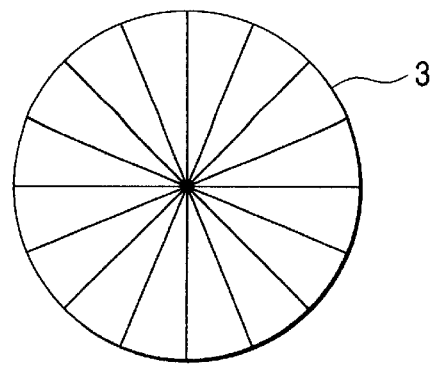
FIG. 2 shows an exemplary construction/shape of a saucer used in the present invention.
Figure 3:
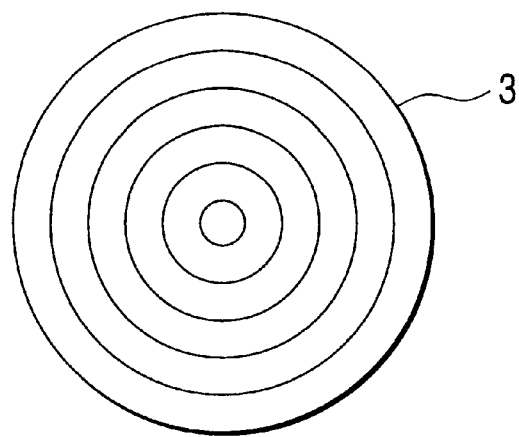
FIG. 3 shows an exemplary construction/shape of a saucer used in the present invention.
Figure 4:
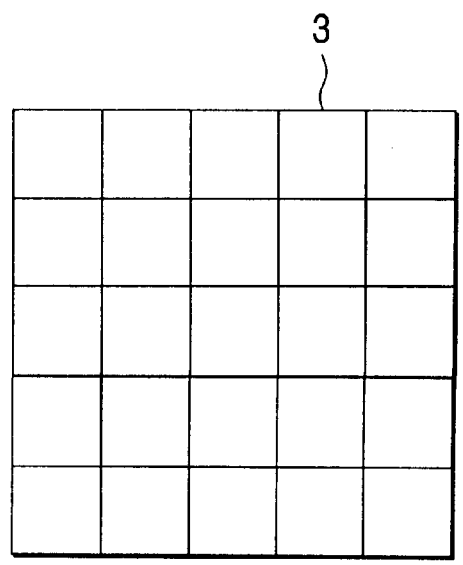
FIG. 4 shows an exemplary construction/shape of a saucer used in the present invention.

FIG. 1 shows a structure of the first embodiment of the present invention. FIGS. 2 to 4 show structures of a saucer. In these figures, like reference numerals refer to like parts in the prior art described above. Reference numeral 1 denotes an injection nozzle which is an object for measurement. Reference numeral 2 denotes a nozzle driving circuit for driving the injection nozzle at any optional valve opening time, frequency and number of times of injection. Reference numeral 3 denotes a saucer installed at a prescribed port below the injection nozzle 1 and partitioned to have a plurality of regions each having a prescribed individual shape and area. To the bottoms of the regions of the saucer 3, measuring tubes 6 are provided to be extended substantially vertically, respectively. Each of the measuring tubes 6 is opened into the bottom of each region of the saucer 3 and is provided, in its lower end, with a pressure sensor 7. In the first embodiment shown in FIG. 1, the bottom of each region of the saucer 3 is slanted toward the opening end of the measuring tube 6, and the measuring tubes 6 have equal sectional areas, respectively. Reference numeral 8 denotes a pressurizing pump for sucking up a test solution from the tank 9, pressurizes the solution and supplies it to the injection nozzle 1. Reference numeral 10 denotes a controller for supplying a signal to drive a nozzle driving circuit 2 and computing the quantity of the test solution in response to an input from each pressure sensor 7. The saucer 3 is preferably symmetrically partitioned into regions below the injection nozzle 1 as shown in FIGS. 2–4.

In the spray distribution measuring device according to the first embodiment of the present invention thus structured, when the spray distribution characteristic of the injection nozzle 1 is measured, each pressure sensor 7 is filled with a suitable quantity of test solution, and the controller 10 reads the output from each pressure sensor at this time as an initial value. Upon completion of reading the initial value, the controller 10 supplies a signal to the nozzle driving circuit 2. Thus, the test solution is sprayed in a prescribed pattern from the injection nozzle 1. The sprayed test solution becomes foggy to be trapped by each region of the saucer 3. The test solution flows into each measuring tube 6 and is accumulated therein at a height corresponding to the amount of solution trapped by each region of the saucer 3. Each pressure sensor senses the height as a head pressure and supplies it as an output to the controller 10. The controller 10 computes the trapped quantity of solution per an unit area for each region of the saucer 3 in terms of a difference between the output from the pressure sensor 7 and the initial value therefor and the area of each region of the saucer 3, and produces the distribution thereof. In this way, the spray distribution measuring device according to the first embodiment, in which the controller 10 computes collectively the spray distribution using the difference between the measured value and initial value for each pressure sensor 7, can measure the spray distribution with high accuracy and for a short time, and also efficiently by using the shape of partition of the saucer 3 according to an object.

Embodiment 2

Figure 5:
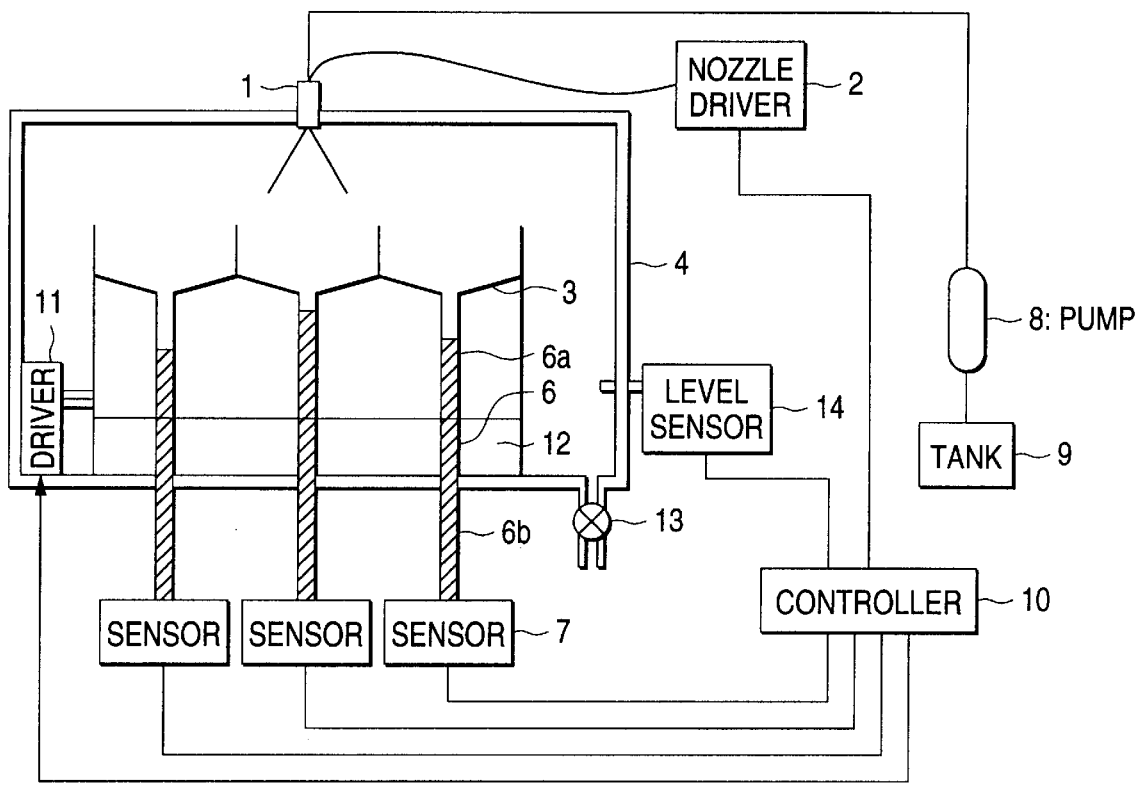
FIG. 5 shows the construction of the second embodiment of the present invention.
Figure 6:
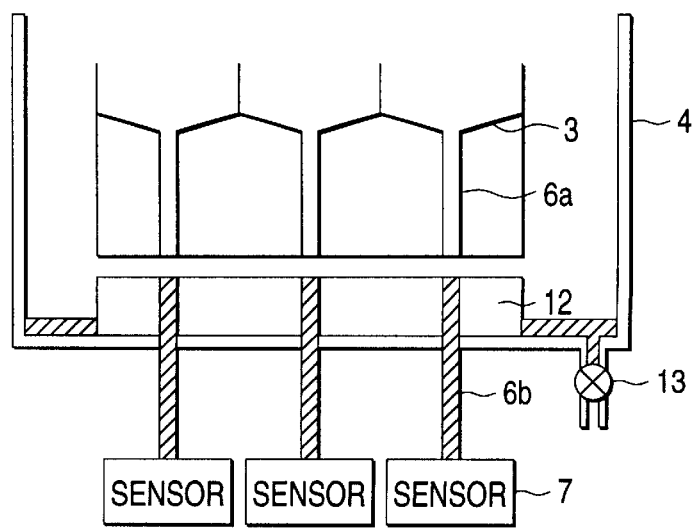
FIG. 6 is a view for explaining the operation of the second embodiment of the present invention.

FIGS. 5 and 6 show a spray distribution measuring device according to the second embodiment of the present invention. FIG. 5 is an arrangement view, and FIG. 6 is a view for explaining an operation. In this embodiment, each measuring tube 6 is divided into a upper measuring tube 6a and a lower measuring tube 6b. The upper measuring tube 6a is movably housed integrally to the saucer 3 within a chamber 4. The lower measuring tube 6b, having a pressure sensor 7 at its lower end, is inserted into the chamber 4 externally from below and held by a holder 12 within the chamber 4. The upper measuring tube 6a and saucer 3 are installed to be moved vertically by a driving device 11 receiving the signal from the controller 10. FIG. 5 shows the state where the upper measuring tube 6a and saucer 3 have been driven downward. In this state, the upper measuring tube 6a and lower measuring tube 6b are connected to each other. FIG. 6 shows the state where they have been driven upward. In this state, the upper measuring tube 6a and lower measuring tube 6b are separated from each other on the upper surface of the holder 12. Incidentally, reference numeral 13 denotes a drain valve for draining the test solution within the chamber 4. Reference numeral 14 denotes a liquid level sensor for detecting the liquid face in the chamber 4. Reference numeral 1 denotes an injection nozzle as an measurement object attached to the upper surface of the chamber 4.

In the spray distribution measuring device thus constructed according to the second embodiment of the present invention, the measurement is initialized by filling the test solution to the upper surface of the lower measuring tube 6b in response to a signal from the controller 10. When the upper measuring tube 6a falls to connect to the lower measuring tube 6b, the controller 10 reads the liquid level as an initial value and causes a test solution to be sprayed from the injection nozzle 1. Thereafter, in the same manner as the first embodiment, the measurement is carried out. After the measurement at the first time, the controller 10 supplies a signal to drive the driving device 11 so that the saucer 3 and upper measuring tube 6a are moved once upwards as shown in FIG. 6. The measurement is initialized again by draining the test solution in the upper measuring tube 6a. Thus, preparation for the measurement at the second time is completed. In this way, the measurement can be carried out continuously without opening the chamber 4. The test solution drained from the upper measuring tube 6a is once held in the chamber 4, and when it reaches a prescribed quantity, the drain valve 13 opens to drain it externally.

Embodiment 3

Figure 7:
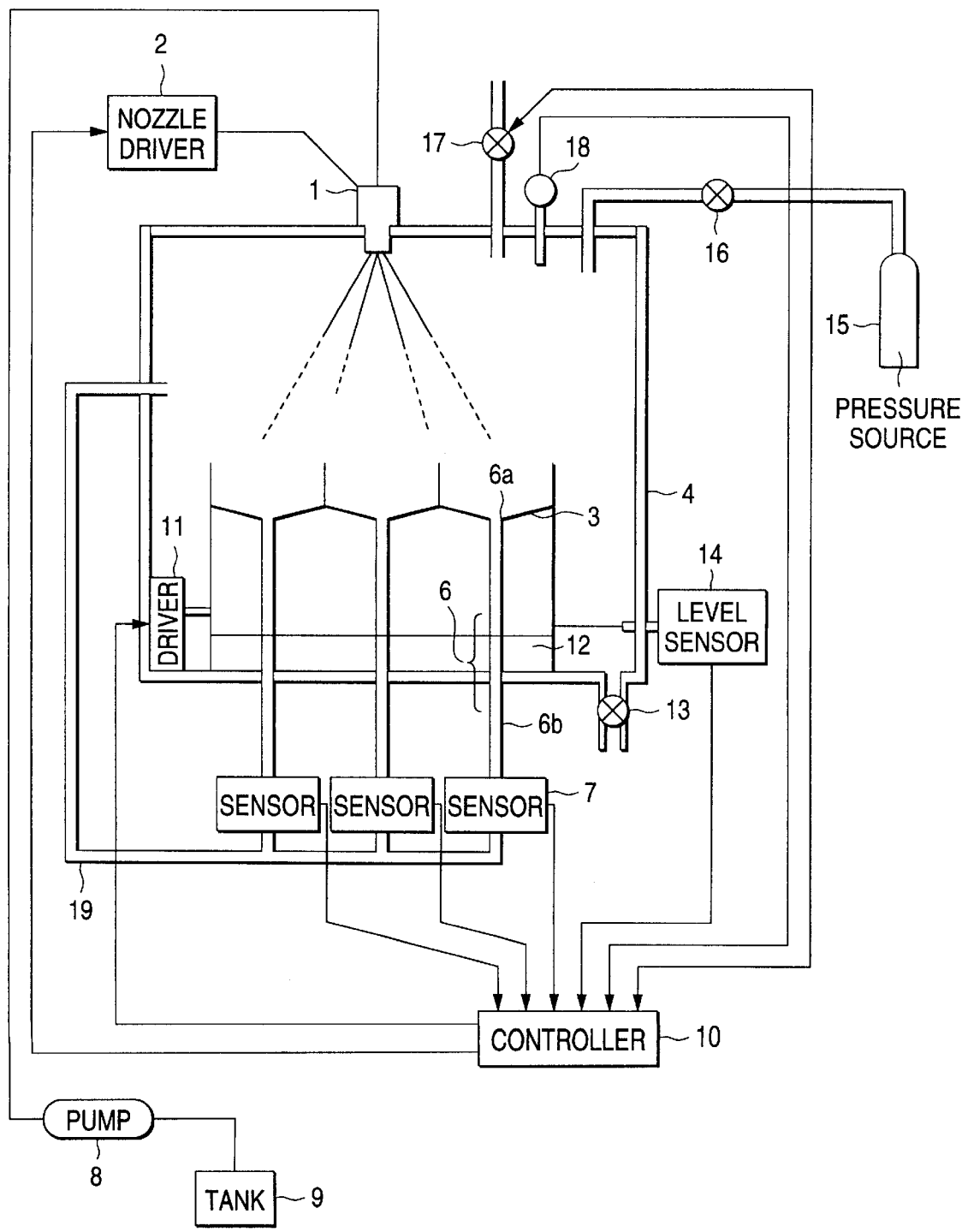
FIG. 7 shows the construction of the third embodiment of the present invention.
Figure 8:
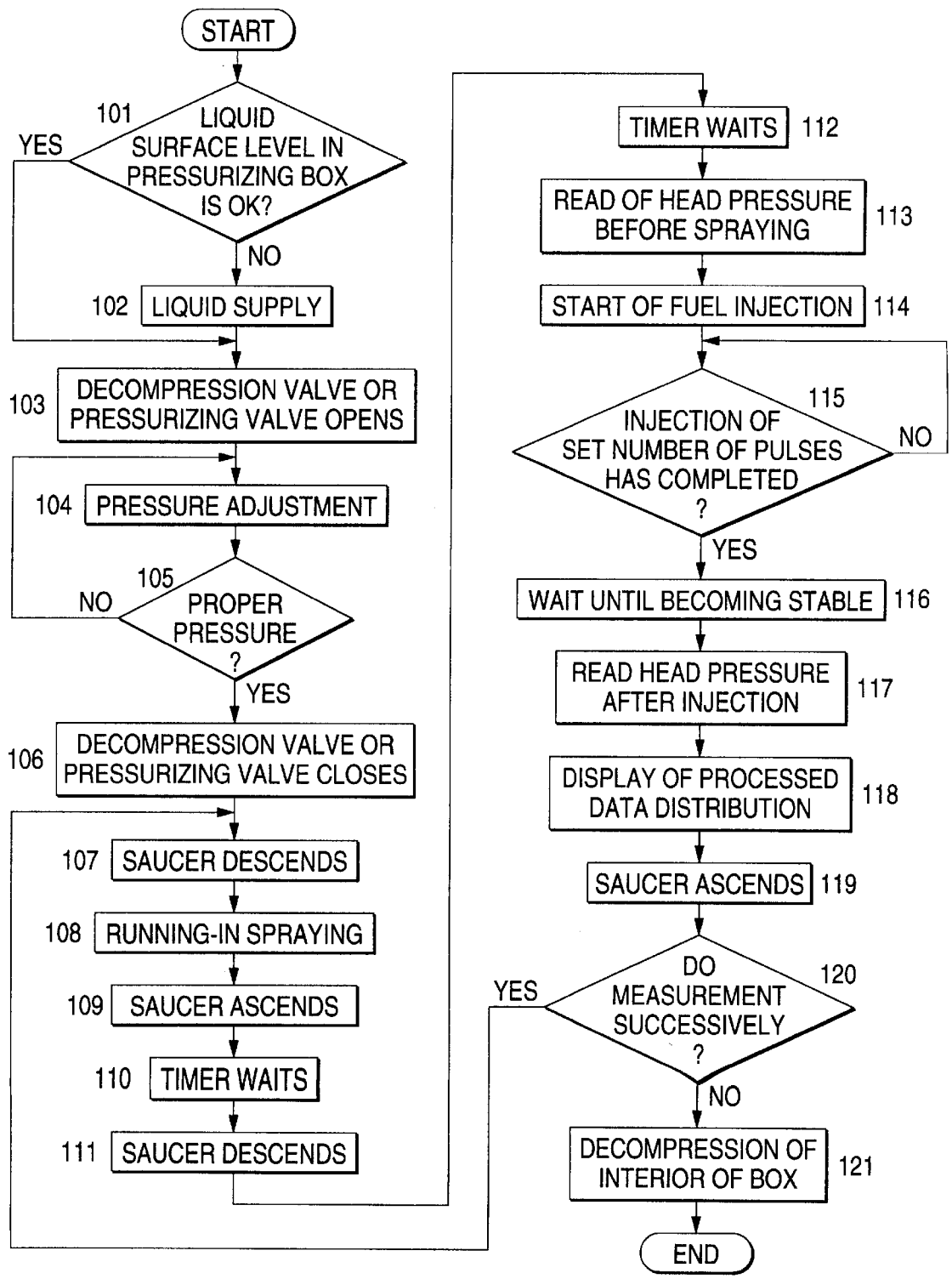
FIG. 8 is a flowchart showing the operation of the third embodiment of the present invention.
Figure 9:
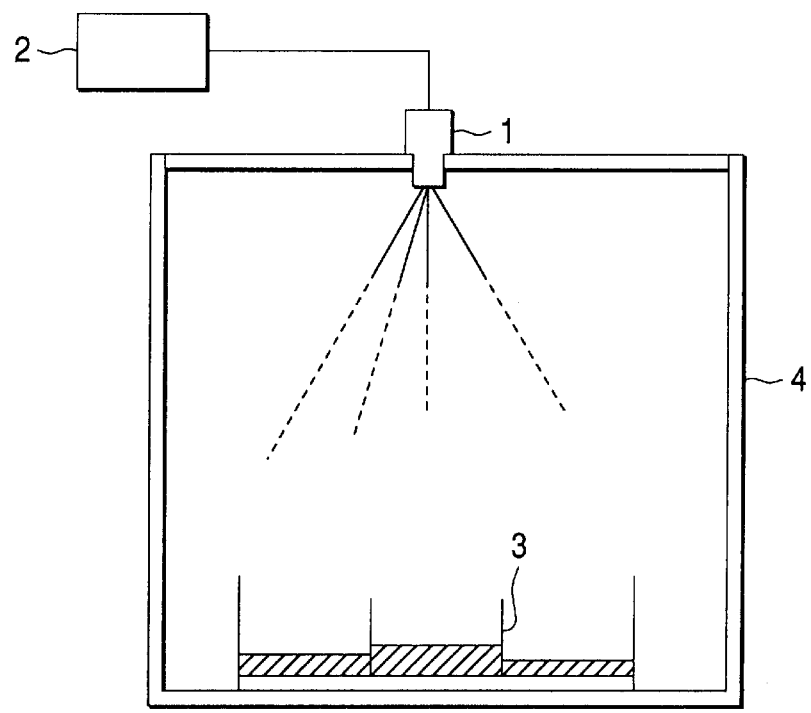
FIG. 9 shows an arrangement of a conventional spray distribution measuring device.
Figure 10:
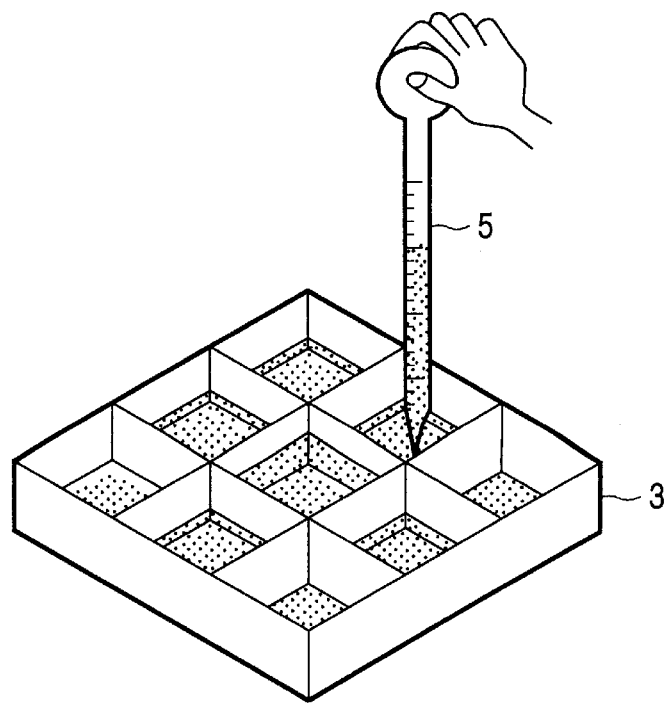
FIG. 10 is a view for explaining a measuring method in a conventional spray distribution device.

FIG. 7 shows an arrangement of the spray distribution device according to the third embodiment of the present invention. FIG. 8 is a flowchart of the operation thereof. In this embodiment, as shown in FIG. 7, like the second embodiment, the saucer 3, upper measuring tube 6 and driving device 11 for driving them vertically are housed within the chamber 4 having the injection nozzle 1 at the top. On the bottom of the chamber 4, the holder 12 is provided for holding the lower measuring tube 6b inserted into the chamber 4 externally from below and having the pressure sensor 7 at its lower end. The chamber 4 also includes a drain valve 13 and a liquid level sensor 14. In the third embodiment, the chamber 4 includes a pressure source 15 for supplying positive or negative pressure, a valve 16 for controlling the pressure, a valve 17 opening/closing between the interior of the chamber 4 and the atmospheric pressure, a pressure detection sensor 18 for detecting the pressure of the pressure within the chamber 4, and a reference pressure path 19 for guiding the pressure within the chamber 4 as a reference pressure to the pressure sensor 7. The valves 16 and 17 are controlled by the controller 10 in response to the output from the pressure detecting sensor 18 so that the pressure within the chamber 4 is maintained constant.

The spray distribution measuring device thus constructed according to the third embodiment of the present invention permits the spray distribution to be measured with high accuracy and with high efficiency. The pressure source may be, for example, a nitrogen gas supplying source when the high pressure within the chamber 4 is intended, and may be a vacuum pump when the low pressure within the chamber 4 is intended. Like the second embodiment, the measurement can be initialized by draining the test solution in the upper measuring tube 6a within the chamber 4. For this reason, the measurement can be carried out under the conditions of various pressures. Further, the pressure within the chamber 4 is supplied as a background pressure for the pressure sensor 7, the measurement can be carried out with high accuracy in the same fashion as under the atmospheric pressure. Now referring to the arrangement view of FIG. 7 and flowchart of FIG. 8, an explanation will be given of the operation of the spray distribution measuring device according to the third embodiment of the present invention.

First, the controller 10 checks if or not the liquid surface level of the measuring tube 6 is correct using the liquid surface level sensor 14 (Step 101). If "NO", the test solution is added to place the liquid surface on the upper end surface of the holder 12 (Step 102). The controller 10 controls to open or close the valves 16 and 17 on the basis of the output from the pressure detection sensor 18 to set the pressure within the chamber 4 at a target value. When the pressure reaches the target value, the valves 16 and 17 are closed (Steps 103–106). Subsequently, the driving device lowers the saucer 3 and the upper measuring tube 6a so that they are connected to each other (Step 107). Prior to the measurement, in order to improve its accuracy, running-in spraying is carried out (Step 108). After the running-in spraying, the upper measuring tube 6a is separated from the lower measuring tube 6b (Step 109). The upper measuring tube 6a is held for a prescribed time until the test solution is completely drained from the upper measuring tube 6a (Step 110). After the test solution has been drained, the upper measuring tube 6a is connected to the lower measuring tube 6b again (Step 111) and stabilizes the liquid surface for a prescribed time (step 112).

Upon completion of the above initialization, the controller 10 reads the initial value of each pressure sensor 7 (Step 113). The controller 10 drives the nozzle driving circuit 2 (Step 114), supplies pulses to the injection nozzle 1 by the number of times of valve opening so that the test solution is sprayed from the nozzle 1 (Step 115). A time is elapsed until the surface of the test solution standing in the upper measuring tube 6a becomes stable (Step 116). Thereafter, the controller 10 reads the head pressure of the measuring tube 6 which is an output from each pressure sensor 7 (Step 117). The controller 10 performs the data processing on the basis of the difference between the head pressure and initial value for each measuring tube and the area of the sauce 3 thereby computing the amount of spray for each measuring tube 6 and displaying the resultant spray distribution in the form of graph, pattern or numerical values (Step 118). Upon completion of the first time measurement, the upper measuring tube 6a is separated from the lower measuring tube 6b by the driving device 11, and the test solution is drained from the upper measuring tube 6a (Step 119). After the measurement is initialized again, the measurement process is returned to step 107 for the second time measurement (step 120). Upon completion of the measurement, the pressure within the chamber 4 is returned to the atmospheric pressure (step 121). Thus, the entire process of measurement is ended.

As described above, in the spray distribution measuring device according to the present invention, the measuring tube is provided vertically below each of the regions of the saucer for receiving the spray from the injection nozzle, the pressure sensor is attached to the lower end of each measuring tube, and the controller is caused to read the head pressure of each measuring tube after spraying to compute the quantity of spray on the basis of the initial value before spraying and the read value. Thus, the spray distribution can be measured with high accuracy in a short time.

The measuring tube is separated into an upper measuring tube and lower measuring tube which can be separated from and connected to each other by an external instruction. Therefore, the measurement can be initialized without opening the chamber and hence can be carried out continuously. Particularly, under the other prescribed pressure than the atmospheric pressure, the spray distribution can be measured very efficiently and with high accuracy, thereby providing an excellent spray distribution measuring device.

What is claimed is:

1. A spray distribution measuring device comprising:
    a spray nozzle;
    a saucer arranged below the spray nozzle and partitioned into a plurality of regions;
    measuring tubes installed substantially vertically from the respective regions of the saucer, an upper end of each of the measuring tubes opening into a bottom of each region of the saucer;
    pressure sensors each installed at a lower end of each of the measuring tubes to measure a head pressure of each measuring tube wherein each of said pressure sensors outputs a signal representing the head pressure of each of the corresponding measuring tubes; and
    a controller for computing a difference between the pressure applied to each of the pressure sensors and an initial pressure; and
    wherein each top opening for each of the plurality of partitioned regions below the spray nozzle is larger than each opening of the corresponding measuring tube which opens into the bottom of each region of the saucer.

2. A spray distribution measuring device comprising:

a spray nozzle;

a saucer arranged below the spray nozzle and partitioned into a plurality of regions;

measuring tubes installed substantially vertically from the respective regions of the saucer, an upper end of each of the measuring tubes opening into a bottom of each region of the saucer;

pressure sensors each installed at a lower end of each of the measuring tubes to measure a head pressure of each measuring tube, wherein each of said pressure sensors outputs a signal representing the head pressure of each of the corresponding measuring tubes; and a controller for computing a difference between the pressure applied to each of the pressure sensors and an initial pressure; and wherein said plurality of regions are contiguous.

3. A spray distribution measuring device comprising:

a spray nozzle;

a saucer arranged below the spray nozzle and partitioned into a plurality of regions;

measuring tubes installed substantially vertically from the respective regions of the saucer, an upper end of each of the measuring tubes opening into a bottom of each region of the saucer;

pressure sensors each installed at a lower end of each of the measuring tubes to measure a head pressure of each measuring tube; and a controller for computing a difference between the pressure applied to each of the pressure sensors and an initial pressure; and wherein each of said measuring tubes is divided into an upper measuring tube and a lower measuring tube, and the saucer and upper measuring tubes are integrated and movably housed within a chamber to move towards and away from the lower measuring tubes.

4. A spray distribution measuring device according to claim 3, wherein a pressure within the chamber is made variable.

5. The spray distribution measuring device according to claim 3, wherein the pressure within the chamber is applied to each pressure sensor as a background pressure.

6. A spray distribution measuring device according to claim 3, wherein a pressure within the chamber is made variable.

7. A spray distribution measuring device according to claim 3, wherein the pressure within the chamber is applied to each pressure sensor as a background pressure.

8. A spray distribution measuring device according to claim 3, further comprising a drain valve for draining a test solution provided within the chamber.

9. A spray distribution measuring device comprising:

a spray nozzle;

a saucer arranged below the spray nozzle and partitioned into a plurality of regions;

measuring tubes installed substantially vertically from the respective regions of the saucer, an upper end of each of the measuring tubes opening into a bottom of each region of the saucer;

pressure sensors each installed at a lower end of each of the measuring tubes to measure a head pressure of each measuring tube; and a controller for computing a difference between the pressure applied to each of the pressure sensors and an initial pressure; and wherein each of said measuring tubes is divided into an upper measuring tube and a lower measuring tube, and the saucer and upper measuring tubes are integrated and movably housed within a chamber to move towards and away from the lower measuring tubes; and further comprising a driving device for moving the saucer and upper measuring tubes housed within said chamber to separate the lower measuring tubes each inserted into the housing externally from below and said upper measuring tubes from each other and to connect them to each other.

10. A spray distribution measuring device according to claim 9, wherein a pressure within the chamber is made variable.

11. A spray distribution measuring device according to claim 9, wherein the pressure within the chamber is applied to each pressure sensor as a background pressure.

12. A spray distribution measuring device according to claim 9, further comprising a drain valve for draining a test solution provided within the chamber.

* * * * *